United States Patent [19]

Andrew et al.

[11] Patent Number: 4,810,472
[45] Date of Patent: Mar. 7, 1989

[54] APPARATUS FOR STEAM REFORMING HYDROCARBONS

[75] Inventors: Sydney P. Andrew, Hartlepool; Ralph J. Doy, Saltburn-by-the-Sea; Antony P. J. Limbach, Stockton-on-Tees, all of England

[73] Assignee: Imperial Chemical Industries PLC, London, England

[21] Appl. No.: 29,236

[22] Filed: Mar. 23, 1987

Related U.S. Application Data

[62] Division of Ser. No. 832,425, Feb. 24, 1986, Pat. No. 4,690,690.

[30] Foreign Application Priority Data

| Mar. 5, 1985 | [GB] | United Kingdom | 8505684 |
| Jul. 25, 1985 | [GB] | United Kingdom | 8518824 |
| Aug. 21, 1985 | [GB] | United Kingdom | 8520890 |
| Aug. 21, 1985 | [GB] | United Kingdom | 8520891 |

[51] Int. Cl.$^4$ .................................. B01J 8/06
[52] U.S. Cl. ........................ 422/197; 48/94; 48/196 A; 422/202; 422/312
[58] Field of Search .............. 252/373; 422/197, 202, 422/203, 204, 241, 312, 240; 48/94, 196 A, 214 R, 214 A; 423/651; 196/110

[56] References Cited

U.S. PATENT DOCUMENTS

| 2,759,805 | 8/1956 | Erickson et al. | 48/196 A |
| 3,450,514 | 6/1969 | Sinfelt et al. | 48/214 A |
| 3,479,298 | 11/1969 | Sze et al. | 252/373 |
| 3,539,304 | 11/1970 | Mevenkamp et al. | 422/312 |
| 3,600,141 | 8/1971 | Mevenkamp et al. | 422/197 |
| 3,607,125 | 9/1971 | Kydd | 252/373 |
| 3,682,605 | 8/1972 | Wada | 48/196 A |
| 4,224,298 | 9/1980 | Robinson | 48/214 A |
| 4,229,419 | 10/1980 | Haese | 422/197 |
| 4,271,086 | 6/1981 | Supp et al. | 252/373 |
| 4,371,452 | 2/1983 | Ohsaki et al. | 252/373 |

FOREIGN PATENT DOCUMENTS

| 124226 | 11/1984 | . |
| 141490 | 2/1981 | Japan . |
| 330872 | 6/1930 | United Kingdom . |
| 1519100 | 7/1978 | United Kingdom . |

Primary Examiner—David L. Lacey
Assistant Examiner—Joye L. Woodard
Attorney, Agent, or Firm—Cushman, Darby & Cushman

[57] ABSTRACT

An apparatus for conducting an endothermic catalytic reaction wherein closed ended, i.e., double pass, externally heated reformer tubes are employed. The inner return tube are insulated so that there is only a small temperature drop between the reacted gas leaving the catalyst zone and entering the return tubes and the gas leaving the return tubes. The outer, closed end, tubes preferably have fins to increase the surface area, and are surrounded by sheaths through which a heating medium passes. The heating medium is preferably hot gas obtained by subjecting the primary reformed gas to secondary reforming.

15 Claims, 7 Drawing Sheets

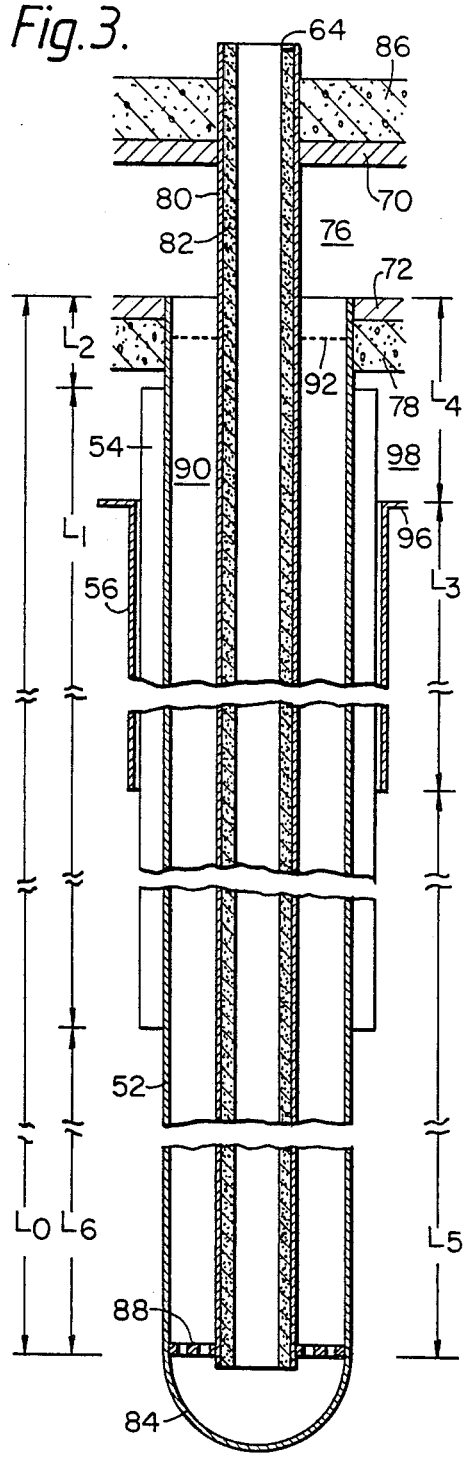
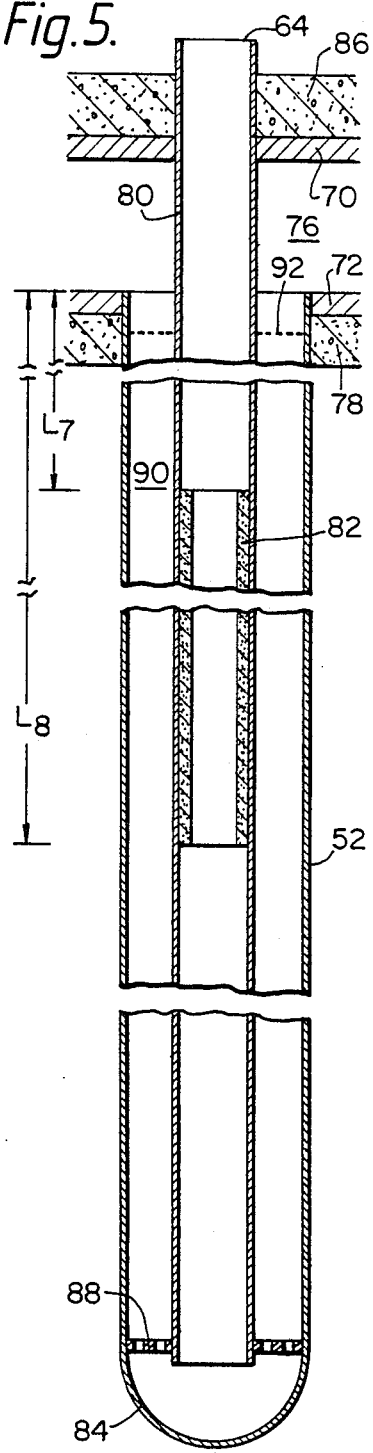
Fig.3.
Fig.5.

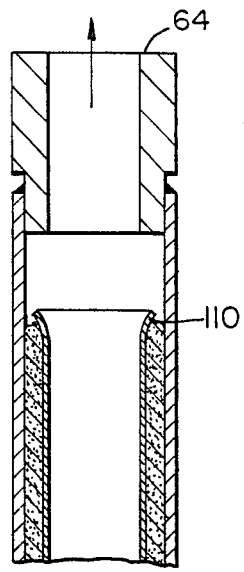
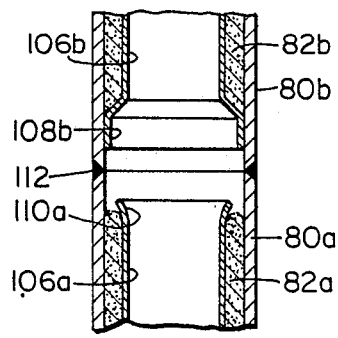
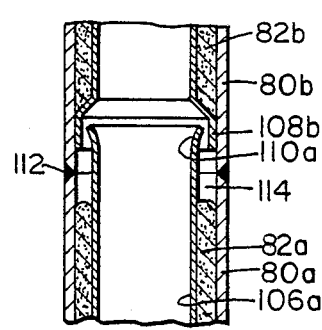
Fig. 6.
Fig. 6a.
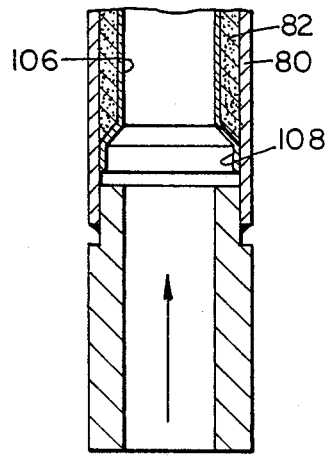

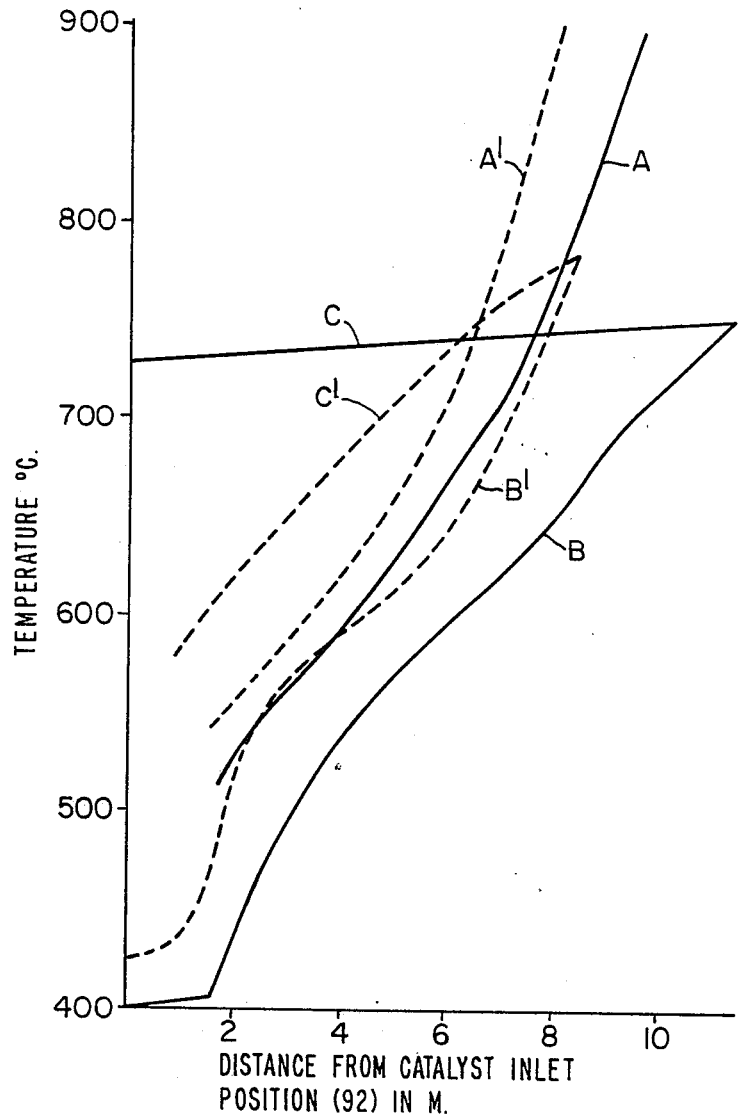

APPARATUS FOR STEAM REFORMING HYDROCARBONS

This is a division of application Ser. No. 832,425, filed Feb. 24, 1986, and now U.S. Pat. No. 4,690,690.

RELATED APPLICATIONS

BACKGROUND OF THE INVENTION

This invention relates to a process of steam reforming hydrocarbons to produce a gas containing carbon oxides and hydrogen and to a reactor assembly for carrying out the process.

In the majority of steam reforming processes proposed or in industrial use, the endothermic steam hydrocarbon reaction typified by $$CH_4 + H_2O \rightarrow CO + 3H_2 \quad \Delta H = 49.3 \text{ kcal/gmol}$$

is carried out over a catalyst disposed as a bed in tubes externally heated in a combustion furnace and heat is recovered by producing steam. However, in a long known and occasionally industrially used process, the hot reformed gas leaving the catalyst bed is withhdrawn through an inner tube within the catalyst bed, so that heat is exchanged between that hot gas and reactants reacting over the catalyst. Examples of this process are described in GB-A-330872, U.S. Pat. No. 271,086 and our EP-A-124226. This arrangement of the reaction zone, referred to commonly as "bayonet-tube" or "field tube" or "double-pass" primary reformer is evidently advantageous in providing a useful heat recovery and in avoiding construction problems due to differential thermal expansion.

We have now realized that the heat transfer properties of the double pass type of reformer can be improved in a way that is especially advantageous when the source of heat is not independent of the reforming stage.

DESCRIPTION OF THE INVENTION

According to the invention in its first aspect a process for producing a product gas stream containing hydrogen and carbon oxides by incomplete catalytic reaction of a hydrocarbon feedstock with steam and/or carbon dioxide by passing a reactants stream containing said feedstock and said steam and/or carbon dioxide over a catalyst disposed in an elongated, externally heated, zone and withdrawing the product gas stream through a tube within that zone and countercurrently to the flow of said reactants stream over the catalyst: is characterized by limiting heat exchange between the product gas stream and the reactants stream across the wall of the tube so that the temperature of the product gas stream leaving the tube is less than that of such stream leaving the elongated zone by at most 100° C.

The effect of limiting the heat exchange between the product gas stream and the reactants is that, at regions of the elongated zone intermediate the ends thereof, the temperature of the reactants is lower, and consequently the temperature difference between the reactants and the heating medium external to the elongated zone is greater, than if such heat exchange had taken place. Therefore heat transfer between the heating medium and the reactants is more efficient and the number and/or length of the reaction zones required to process a given quantity of feedstock is less; particular expedients can be used to enhance this heat transfer further, as will be described below.

The process of the invention is especially valuable when the elongated zone is heated by secondary reformer gas; that is, the hot gas resulting from reacting the product gas stream with a gas containing free oxygen in an adiabatic catalyst zone whereby to effect reaction of further hydrocarbon to carbon oxides and hydrogen.

In the process of the invention, unlike the use of the prior double-pass reformer, internal heat recovery between the product gas stream and the reactants is not available. However heat recovery equivalent to said internal heat recovery is obtained where the medium for external heating of the elongated zone is secondary reformer gas as aforesaid. Even though there is no internal heat recovery between the product gas stream and the reactants, the process may still be valuable when using other sources of heat, such as fuel combustion products or hot helium nuclear reactor coolant.

Preferably the medium for external heating of the elongated zone is gas at a pressure in the range 5 to 80 bar abs, since this allows improved heat transfer in comparison with a conventional reformer furnace to be achieved and, in the event that an independent fuel is combusted, permits a useful energy recovery by expansion of the combustion products in an engine.

The hyrocarbon feedstock can in principle be any that can be vaporised and can be desulphurised thoroughly enough to permit the catalytic reaction with steam. Usually it has a boiling point under 220° C. and preferably it is normally gaseous, natural gas being very suitable. If desired, the reactant mixture used can be or include the product of reacting hydrocarbons higher than methane with steam in adiabatic conditions to give a methane-rich gas.

The molar ratio of (steam $+CO_2$) to hydrocarbon carbon atoms in the feedstock is typically in the range 2 to 5.

The pressure of the product gas stream at the outlet of the elongated zone, i.e. where the product gas enters the tube, is typically in the range 25 to 80 bar abs. and preferably differs from that external to the elongated zone by no more than 5 bar.

The elongated zone reactants inlet temperature is typically in the range 200° to 600° C., especially 350° to 450° C., and can be conveniently brought to this temperature by heat exchange with the product gas stream leaving the tube, or in the event that the product gas stream is subjected to secondary reforming as aforesaid and the secondary reformer gas is used as the external heating medium for the elongated zone, with cooled secondary reformer gas, that is, such gas after use as the external heating medium.

The temperature at which the product gas stream leaves the elongated zone and enters the tube is typically in the range 650° to 850° C., especially 700° to 800° C.

The combination of (steam $+CO_2$) ratio, pressure and temperature is preferably such that the product gas contains 15-30% v/v of $CH_4$ on a dry basis.

The limitation of heat exchange across the tube wall is preferably such that after leaving the elongated zone, the product gas stream is cooled by less than 30° C. during its passage along the tube; this is effected by insulation inside and/or outside the tube, and thus expedients such as finning or a turbulator inside the tube or extended tube length are inappropriate to the invention, in contrast with prior processes.

Where the elongated zone is heated by secondary reformer gas, preferably the product gas stream is fed from the outlet of the elongated zone, via the tube, to the secondary reformer with as little heat loss as practicable, preferably with no more than a 50° C. fall in temperature. In the secondary reformer the product gas stream, and optionally a further amount of feedstock is reacted with a gas containing free oxygen, preferably air, moderately enriched air (up to 35% $v/v$ $O_2$), or possibly oxygen depleted air (down to 15% $v/v$ $O_2$). As usually carried out, this reaction initially produces a flame whereafter the temperature decreases as methane in the product gas stream reacts endothermally with steam and $CO_2$, but a flameless catalytic reaction could be used. The outlet temperature of the secondary reformer gas is typically in the range 950°–1050° C.

The rate of feed of oxidant gas mixture to the secondary reformer is preferably such as to give a secondary reformer gas having a methane content of under 5, for example 0.01 to 1, % $v/v$ on a dry basis.

The reforming process of the invention is of particular use in the production of ammonia synthesis gas, with secondary reforming effected using air as the gas containing free oxygen. For ammonia synthesis the secondary reformer gas is normally subjected to the shift reaction, carbon dioxide removal, and methanation to remove residual carbon oxides. In conventional processes the amount of air employed in secondary reforming is often controlled to give a secondary reformer gas wherein the molar ratio of hydrogen plus carbon monoxide to nitrogen (which is introduced from the air) is about 3 (or slightly above to allow for the hydrogen consumed during methanation). However in the process of the invention where the elongated zone is heated by secondary reformer gas and the secondary reforming is effected using air as the gas containing free oxygen, at the preferred product gas, and secondary reformer gas, methane contents, the quantity of air required is such that the amount of nitrogen added is in a substantial excess of what would be suitable for ammonia synthesis gas: generally the amount of air required is such that the aforesaid ($H_2$+CO)/$N_2$ ratio of the secondary reformer gas is less than 3.0, for example in the range 1.0 to 2.7. Taking into account the argon introduced in the air and any unreacted methane, the amount of air employed, and the reforming conditions, are preferably such that the molar ratio of hydrogen plus carbon monoxide to methane plus argon plus nitrogen is in the range 1.25 to 2.5, especially 1.4 to 2.1 and at least 90% $v/v$ of the methane plus argon plus nitrogen is nitrogen. Such a secondary reformer gas composition is especially suitable when it is to be processed to ammonia synthesis gas by the process of our EP-A-157480. As an alternative the excess nitrogen can be removed cryogenically before ammonia synthesis, e.g. as described in GB-A-1156002, or from reacted ammonia synthesis gas, after separation of ammonia therefrom and before recycle thereof to ammonia synthesis, e.g. as described in EP-A-00993.

In alternative applications of the process the oxidant in the secondary reformer can be substantially pure oxygen, whereby to produce a nitrogen-free gas stream suitable for synthesis of organic compounds such as methanol. In another form of the process the heating medium is the product of combusting a waste gas from downstream stage, for example a pressure swing adsorption waste gas or synthesis purge gas.

Whichever heating medium is brought into heat exchange with the elongated zone, such heat exchange is highly intense and is preferably carried out by passing a stream of the heating medium in a direction countercurrent to the flow of reactants through the elongated zone through a sheath surrounding the elongated zone and extending for at least the major part of the length thereof. The dimensions of the sheath should be such that the cross-sectional area of the space between the sheath and the elongated zone is between 0.1 to 1.0, especially 0.2 and 0.5, times the cross-sectional area of the space between the wall of the elongated zone and the tube located therein. Alternatively, or additionally, the outer wall of the elongated zone preferably has, for at least the major part of the length thereof, an extended surface such as is given by longitudinal or helical fins, or studs.

The extent and dimensions of the sheath, and the extent and nature of the extended surface, are preferably selected such that there is a substantially uniform heat flux from the heating medium into the elongated zone along the length thereof.

In some cases, if the sheath and/or extended surface extended right to the outlet end of the elongated zone, there may be a risk of overheating of the outlet end region of the elongated zone and/or the sheath, which is preferably of light gauge metal, may be subject to unacceptably high temperatures. Thus in preferred arrangements, the outlet end region of the elongated zone extends beyond the sheath and likewise the extended surface of the elongated zone terminates short of the outlet end of the elongated zone. In a particularly preferred arrangement the extended surface of the elongated zone terminates, in the outlet end region of the latter, at a position closer to the outlet end of the elongated zone than does the sheath. In this way the heating of the elongated zone is mainly by radiation at the outlet end region where the elongated zone is unsheathed and has no extended surface, by a mixture of radiation and convection over the intermediate part of the outlet end end region where it is unsheathed but has an extended surface, and mainly by convection in the region where it is sheathed.

Preferably the unsheathed outlet end region of the elongated zone constitutes 10 to 30% of the length of the elongated zone while the part of the outlet end region of the elongated zone that does not have an extended surface constitutes 4 to 20% of the length of the elongated zone.

To enhance the heat flux over the inlet region of the elongated zone, the extended surface may be of greater surface area over this region, for example by increasing the number of fins for the first part, for example the first 30 to 60% of the length of the elongated zone.

By means of the above features the average heat flux into the elongated zone can be very high, over 100 kw per $m^2$ of the interior surface of the external wall of the elongated zone. This average heat flux may be as high as 200 kW $m^{-2}$ but is typically in the range 120–150 kW $m^{-2}$.

Where the elongated zone is heated by secondary reformer gas, the latter cools as it passes along the exterior surface of the elongated zone. During such cooling, especially at the preferred temperatures and pressures, there is a strong driving force for the unwanted side reactions $$2CO \rightarrow C + CO_2 \text{ "Boudouard reaction"}$$

$$CO + H_2 \rightarrow C + H_2O$$

$$CO + 3H_3 \rightarrow CH_4 + H_2O$$

and these will proceed especially if the metal contacted by the gas catalyses these reactions and/or forms carbides and/or removes elemental carbon by catalysing or nucleating the formation of solid carbon. In the high intensity process mentioned above, the sheath and fins provide a particularly large area on which such reactions can take place.

We have found that such unwanted side reactions may be prevented or limited by contacting the hot gas undergoing cooling only with surfaces made of one or more metals having substantially no catalytic activity, whether in metallic or oxide form, for reactions of carbon monoxide.

The metal presented to the hot secondary reformer gas undergoing cooling while in heat exchange with the elongated zone is typically one or more of those whose oxide is at least as difficult to reduce to metal as chromium II oxide, yet whose oxide forms a coherent "passivating" layer substantially preventing further oxidation of the metal. Preferably such metal does not readily form carbides or nitrides. As examples of suitable metals there may be mentioned aluminum, titanium, zirconium, niobium and tantalum and alloys thereof containing not more than 10% w/w of metals outside that list. Very suitably the metal is aluminum containing no other metals or at most 5% w/w of chromium. Because of its low melting point (659° C., aluminum is unsuitable as a constructional metal in the plant in which the process is carried out; however it can be used as a diffusion-bonded layer on a ferrous alloy, such as mild steel, low-chromium steel or chromium nickel steel such as AISI type 304 or 316 and Incoloy (RTM) depending on the temperature to be encountered. The diffusion bonding is carried out so as preferably to form a distinct phase of iron alloy, such as an iron-aluminum alloy containing at least 20% w/w of aluminum. Ferrous alloys so treated are available commercially under the trade-name "ALONIZED" in standard units and procedures for such treatment after fabrication are well established.

The reforming catalysts in the elongated zone and secondary reformer (if used) can be respectively conventional primary and secondary reforming catalysts, such as refractory-supported nickel or cobalt. The elongated zone catalyst should preferably be one having relatively high activity and stability at "low" temperatures, that is, in the range 550° to 650° C. It can be random-packed but can, if desired, be structured.

After leaving the tube (if there is no secondary reforming stage) or the space outside the elongated zone (if there is a secondary reforming stage and the hot gas therefrom is used to heat the elongated zone), the gas is preferably subjected to catalytic shift to convert carbon monoxide to hydrogen plus carbon dioxide.

The catalytic shift reaction can be carried out in conventional ways, for example "high temperature", with an inlet temperature of 330° to 400° C., outlet temperature 400° to 500° C., usually over on iron oxide/chromia catalyst, and affording an outlet carbon monoxide content in the range 2 to 4% v/v on a dry basis;

"low temperature", with an inlet temperature of 190 to 230° C., outlet temperature 250° to 300° C., usually over a catalyst comprising metallic copper, zinc oxide and one or more other difficulty reducible oxides such as alumina or chromia, and affording an outlet carbon monoxide content in the range 0.1 to 1.0% v/v on a dry basis;

"combination", using the sequence of high temperature shift, cooling by indirect heat exchange and low temperature shift; if desired, either shift step can be subdivided with interbed cooling.

Alternatively a "medium temperature" shift can be used, in which the inlet temperature is in the range 250° to 325° C. and the outlet temperature up to 400° C. A suitably formulated supported copper catalyst can be used. The oulet carbon monoxide content is up to 2% v/v on a dry basis.

Whichever shift reaction method is used, it is preferably operated in indirect heat exchange with a coolant, especially water under pressure. Thus the catalyst can be disposed in tubes surrounded by the water, or vice versa. Utilisation of the heat taken up by the water may be by generating steam at for example 15 to 50 bar abs. pressure and use of such steam as feed to the shift step or the steam/hydrocarbon reaction.

The resulting shifted gas is cooled to condense out unreacted steam. If it is to be treated further by pressure swing adsorption (PSA) it can be subjected to selective oxidation or methanation to remove carbon monoxide but need not be contacted with a carbon dioxide absorption liquid. If it is to be subjected to cryogenic nitrogen removal it should be contacted with such a liquid, then methanated and dried. Such further treatments can remove part or all of any nitrogen present depending on the desired composition of the final product.

The present invention also provides apparatus for conducting an endothermic catalytic reaction comprising:

(a) a tubular reactor having
  (i) a first tube, blind at one end, provided with an inlet at the other end,
  (ii) a second tube disposed within, and extending along, the first tube, thereby providing a space between the first and second tubes for receipt of a catalyst, the interior of said second tube communicating with the space between said first and second tubes at the blind end of said first tube, and said second tube having an outlet at the inlet end of said first tube, and
(b) means for supplying a heating fluid to the external surface of the first tube;
characterised in that the second tube carries, for at least part of its length, internally or externally, or both, a layer of thermal insulation.

More particularly such apparatus is part of an assembly (referred to herein as the reactor assembly) including a plurality of such tubular reactors within an outer shell having an inlet and outlet for fluid to be brought into heat exchange with the first tubes of the tubular reactors. Such an outer shell is constructed to withstand a pressure in the range preferably 5 to 80 bar abs, so that the heat exchange fluid can be under superatmospheric pressure and can thus, if appropriate, be utilised in a power recovery engine, and so that the first tubes of the tubular reactors of the assembly can be made of relatively light gauge metal.

The reactor assembly may be combined with the source of heat exchange fluid. For example the source can be an external furnace providing hot combustion gases or a nuclear reactor providing hot pressurised helium or, in the event that the tubular reactor provides the elongated zone of the steam-hydrocarbon reaction process of the first aspect of the invention wherein the heating medium is secondary reformer gas, an oxidative secondary reformer.

Accordingly the invention further provides a reactor assembly as aforesaid in combination with a secondary reformer provided with means for supplying a gas containing free-oxygen thereto, said assembly including first conduit means connecting the outlet of said secondary reformer with the inlet of said outer shell, second conduit means communicating with the inlet of each tubular reactor for supplying a gas stream thereto from outside said outer shell, and third conduit means communicating with the outlet of each tubular reactor for delivering said gas stream, after passage through said tubular reactor, to said secondary reformer.

As an alternative, the reactor assembly can include in the same outer shell an additional section in which such combustion or oxidative reforming takes place.

To complete the heat exchange arrangements of the combination, a further heat exchanger is preferably provided: the hot side of this further heat exchanger being in communication with the outlet for the heat exchange fluid from the shell, and the cold side being in communication with the inlets of the tubular reactors.

The reactor assembly preferably includes fluid flow guide means effective to enhance heat transfer at the surface of the first tubes of the tubular reactors. Such means can include baffles but preferably includes a sheath surrounding each tubular reactor and extending for at least the major part of the length thereof as aforesaid and means to obstruct or prevent flow of such fluid other than through such sheaths. The cross-sectional area between each sheath and its associated tubular reactor is preferably between 0.1 and 1.0, especially 0.2 and 0.5, times the cross-sectional area of the space between the first and second tubes of that reactor. As mentioned hereinbefore the sheath preferably terminates short of the blind end of its associated first tube, leaving 10 to 30% of the length of the first tube unsheathed at the blind end.

As a further enhancement of such heat exchange, the first tube preferably has, for at least a major part of its length as aforesaid, an extended outer surface. If, in the absence of an extended outer surface, the outer surface were considered to be a cylinder of radius equal to the minimum cross-sectional radius of the extended outer surface, it is preferred that, over the part having the extended surface, the external surface area of the first tube is 1.5 to 10 times the area of the curved surface of that cylinder.

For the reasons mentioned hereinbefore, the extended surface preferably terminates short of the blind end of the tube. The first tube thus preferably has a cylindrical portion between the portion having the extended surface and the blind end: it is preferred that this cylindrical portion constitutes 4 to 20% of the length of the first tube.

The extended surface may be provided by, for example, fins, studs, or by the use of a corrugated profile first tube.

The thermal insulation of the second tube preferably is associated therewith for at least that portion of the second tube that occupies the region extending from 10% to 30%, and particularly at least the region extending from 5% to 50%, of the length of the first tube, as measured from the inlet end of the first tube.

Preferably the insulation extends for substantially all the length of the second tube that is within the first tube. The insulation can be provided, for example by a refractory oxidic coating or a sleeve affording an empty gas space or a sleeve enclosing a layer of solid or fibrous refractory oxide and may include a radiation-reflecting layer.

While a metal sleeve enclosing an empty gas space or a fibrous, particularly ceramic fibre, insulant is attractive, difficulties arise as a result of the elongated nature of the reactors and the substantial temperature difference that will occur across the insulation: thus the thermal expansion difference between the second tube and its sleeve presents problems.

A preferred form of construction is to have one end of the sleeve fastened to the second tube with the other end of the sleeve not fastened to the tube but being free to expand or contract.

In some cases it may be desirable to fabricate the tube, and sleeve, in tube sections which are then welded together. In such cases it is preferred that at least two adjacent sections each have a sleeve, with one end of each sleeve fastened to its associated section and the other end free to expand or contract, the free end of the sleeve of one of said adjacent sections being adjacent the fastened end of the sleeve on the section adjacent that one section. In such cases it is preferred that the sleeves of adjacent sleeved sections are dimensioned so that, when fully expanded at the working temperature, the sleeve on one sleeved section extends over substantially all the gap between that section and the adjacent section, thus providing insulation at least by stationary gas in such gap. If practicable, the fibrous insulation may be extendable with the expanding sleeve.

The, or each, sleeve is preferably fastened to its tube, or section therof, at the upstream end of the tube or section. Since, in that case, the insulation is at the pressure of the gas at the free edge, which pressure is lower than that at the secured edge, failure of the sleeve will cause it to yield on to the ceramic insulation, rather than to detach itself. As a result the sleeve is in effect structurally supported by the tube and need be made only of thin gauge metal. Since there is to be a catalyst between the first and second tubes and that catalyst may be in a random packed form, the thermally insulating structure is preferably inside the second, ie inner, tube so that the catalyst units bear against structural metal rather than the relatively thin sleeve.

BRIEF DESCRIPTION OF THE DRAWINGS

The invention is illustrated by reference to the accompanying drawings wherein:

FIG. 3 is an enlarged longitudinal section of one of the reactors of FIGS. 1 and 2

FIG. 5 is a view similar to FIG. 3 but in which the fins and sheaths have been omitted FIG. 6 is an enlarged longitudinal section of the inner tube of a reactor in the "cold state"

FIG. 6a is an enlarged section of part of the inner tube of the reactor of FIG. 6 in the "hot" state

FIG. 9 is a graph showing the temperature profiles of the reactants and heating medium in a reactor according to the invention and in a conventional double-pass reformer.

DESCRIPTION OF THE PREFERRED EMBODIMENTS

Figure 1:
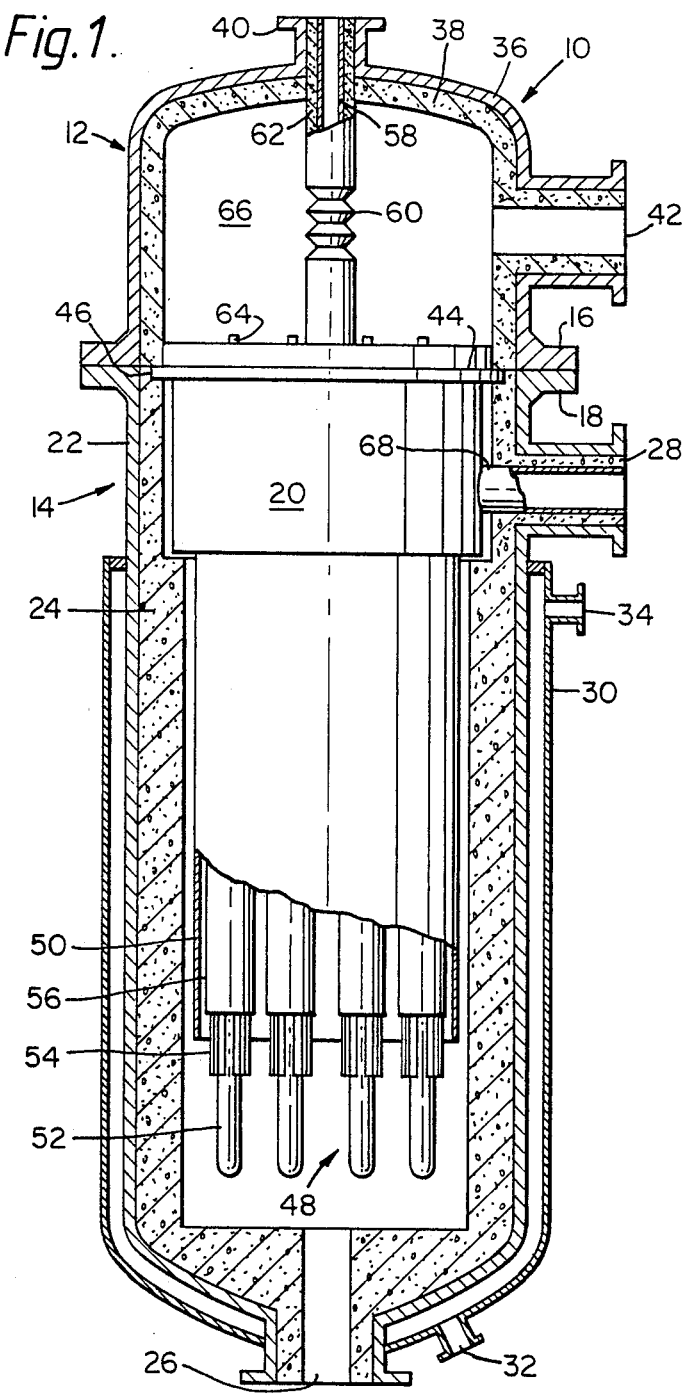
FIG. 1 is a longitudinal section of a reactor assembly shown in diagrammatic form

Referring first to FIG. 1 the assembly 10 has upper and lower sections 12, 14, which mate at flanges 16, 18, and an insert 20. The lower section 14 has a metal pressure shell 22, lined with refractory concrete 24 as insulation, and is provided with secondary reformer gas inlets and outlets 26, 28 respectively. The lower part of shell 22 is surrounded by a jacket 30 to which water can be supplied via port 32 and from which steam can be removed from port 34. Jacket 30 serves to maintain the shell at a desired temperature, e.g. 100° C.

The upper section 12 of assembly 10 has a metal pressure shell dome 36 lined with refractory concrete 38 as insulation and provided with reactants inlet and outlet ports 40, 42 respectively.

The insert 20 is located in lower section 14 by a flange 44 engaging in a recess 46 in the top of the refractory concrete lining 24 of lower section 14. Insert 20 includes a plurality of metal tubular reactors 48 located within a thin gauge metal skirt 50 (shown part cut away) that is spaced from the interior walls of the concrete lining 24 by a distance to allow for thermal expansion of insert 20. Typically there may be fifty to one hundred or more reactors 48 but, for clarity, only four are shown in FIG. 1.

Each reactor 48 has a closed, ie blind-end, tube 52 provided with fins 54 on its surface to increase its surface area and extends from a sheath 56. Reactors 48 are located with respect to each other and with respect to skirt 50 by a light gauge horizontal wire or strip framework (not shown).

Insert 20 has a reactants inlet pipe 58 connected to port 40 of upper section 12 via bellows 60 to allow for thermal expansion. Pipe 58 is provided with insulation 62. Each of reactors 48 has a reactants outlet 64 communicating, via the space 66 within the upper section 12, with the reactants outlet port 42. Insert 20 also has a secondary reformer gas outlet pipe 68 leading from insert 20 through the outlet port 28 in lower section 14.

To enable the assembly 10 to be assembled pipe 68 is not sealed to insert 20 but is a sliding fit therein so that pipe 68 can be withdrawn through port 28 thereby enabling insert 20 to be lifted out of lower section 14 (after removal of upper section 12 therefrom).

Figure 2:
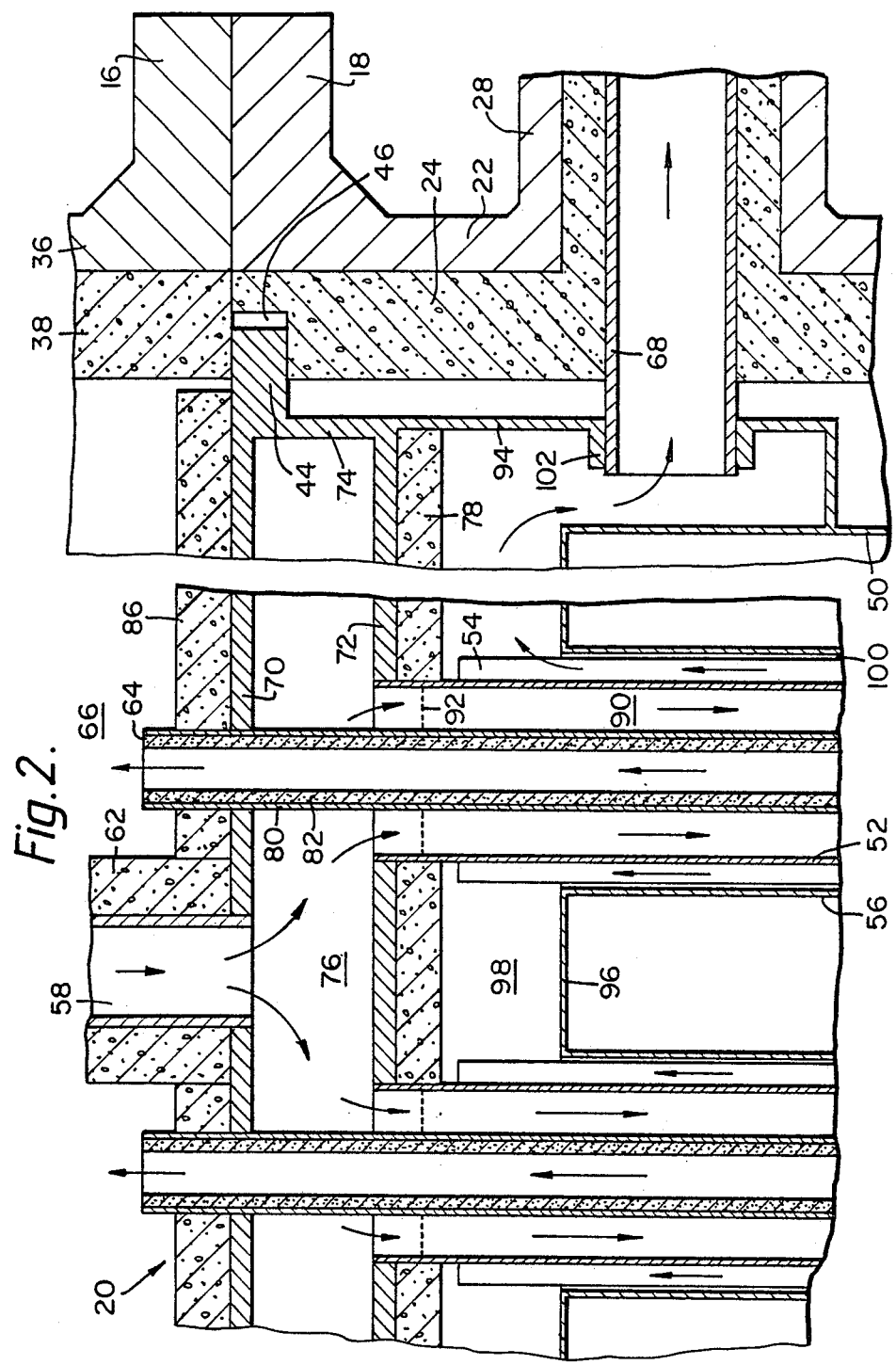
FIG. 2 is an enlarged longitudinal section of part of the assembly shown in FIG. 1

The construction of insert 20 is shown in more detail in FIGS. 2 and 3, and includes upper and lower tube plates 70, 72 respectively, which, with an annular wall 74 and flange 44 form an enclosure 76 to which reactants are fed via reactants inlet pipe 58.

Each outer reactor tube 52 depends from lower tube plate 72, the underside of which is provided with a layer 78 of insulation, while each inner reactor tube 80, which carries a layer of insulation 82 on its interior surface, extends, from above upper tube plate 70, through the enclosure 76 and down inside its associated outer tube 52, terminating, as shown in FIG. 3, near the blind end 84 thereof. Upper tube plate 70 carries a layer of insulation 86.

Although, for the sake of simplicity and clarity, tube plate 70 is shown as being integral with annular wall 74 and lower tube plate 72, in practice upper tube plate 70 can be separated from annular wall 74 and/or lower tube plate 72, leaving inner tubes 80 within their respective outer tubes 52 to enable catalyst to be charged and discharged to the reactors. The catalyst particles are supported by a perforate grid 88 near the blind end 84 of each outer tube 52 and are loaded, in the space 90 between the inner and outer tubes 80 and 52 respecively, up to about the level indicated by dotted line 92.

Extending downwards from the annular wall 74 of enclosure 76 is a metal shroud 94 which is fastened at its lower end to skirt 50. Each sheath 56 surrounding a reactor tube 52 depends from a thin plate 96 integral with skirt 50. Plate 96 thus defines the lower side of an enclosure 98 bounded by shroud 94 and by lower tube plate 72. The enclosure 98 communicates with the spaces 100 between the sheaths 56 and their associated tubes 52: the outlet from enclosure 98 is a sleeve 102 in the wall of shroud 94 through which secondary reformer gas outlet pipe 68 is a sliding fit.

Each outer reactor tube is typically several meters long, typically 5–15 m; referring to FIG. 3 the length of tube 52 from lower tube plate 72 to the catalyst grid 88 is designated $L_o$. The fins 54 on each outer reactor tube 52 extend for a distance $L_1$, starting at a distance $L_2$ below lower tube plate 72. Sheaths 56 extend for a distance $L_3$ from plate 96, which is located at a distance $L_4$ below lower tube plate 72.

In this arrangement the elongated, catalyst containing, zone 90 has a length almost equal to $L_o$. The sheath 56 terminates short of the blind end 84 of tube 52; the unsheathed part at the blind end of the tube 52 thus has a length $L_5$ equal to $L_o-(L_3+L_4)$. It is preferred that $L_5$ is 10 to 30% of $L_o$. Likewise the fins 54 terminate short of the blind end 84 of tube 52: the region of the catalyst-containing elongated zone at the blind end of tube 52 that does not have an extended surface thus has a length $L_6$ equal to $L_o-(L_1+L_2)$. It is preferred that $L_6$ is less than $L_5$ and that $L_6$ is 4 to 20% of $L_o$.

The cross-sectional area of space 90 is $$A_1 = \pi/4 \, (D_1^2 - D_2^2)$$

where $D_1$ and $D_2$ are respectively the interior diameter of 52 and the exterior diameter of tube 80.

Ignoring the cross-sectional area occupied by fins 54, the cross-section area of space 100 is ps $$A_2 = \pi/4 \, (D_3^2 - D_4^2)$$

where $D_3$ and $D_4$ are respectively the interior diameter of sheath 56 and the exterior diameter of the unfinned surface of tube 52.

It is preferred that $A_2$ is 0.1 to 1.0, especially 0.2 to 0.5 times $A_1$.

The fins 54 provide the finned part of tube 52 with an extended surface: if the height of the fins is h and the length of the finned part of tube 52 is l, this extended surface has an area $A_3$ where $$A_3 = \pi D_4 l + 2Nhl$$

where N is the number of fins. There are typically 20 to 100 fins on each tube 52: although not shown in the drawings the finned part of tube 52 nearer lower tube plate 72 may have a greater number, $N_1$, of fins than the finned part remote therefrom. If the finned part remote from tube plate 72 has $N_2$ fins, then the average extended surface, per unit length, of the finned part of tube 52 is $$A_4 = l\pi D_4 + 2_1 (N_1 l_1 + N_2 l_2) h$$

where $l_1$ and $l_2$ are lengths of the parts having $N_1$ and $N_2$ fins respectively.

It is preferred that $$A_4 = 1.5 l\pi D_4 \text{ to } 10 l\pi D_4$$

Figure 4:
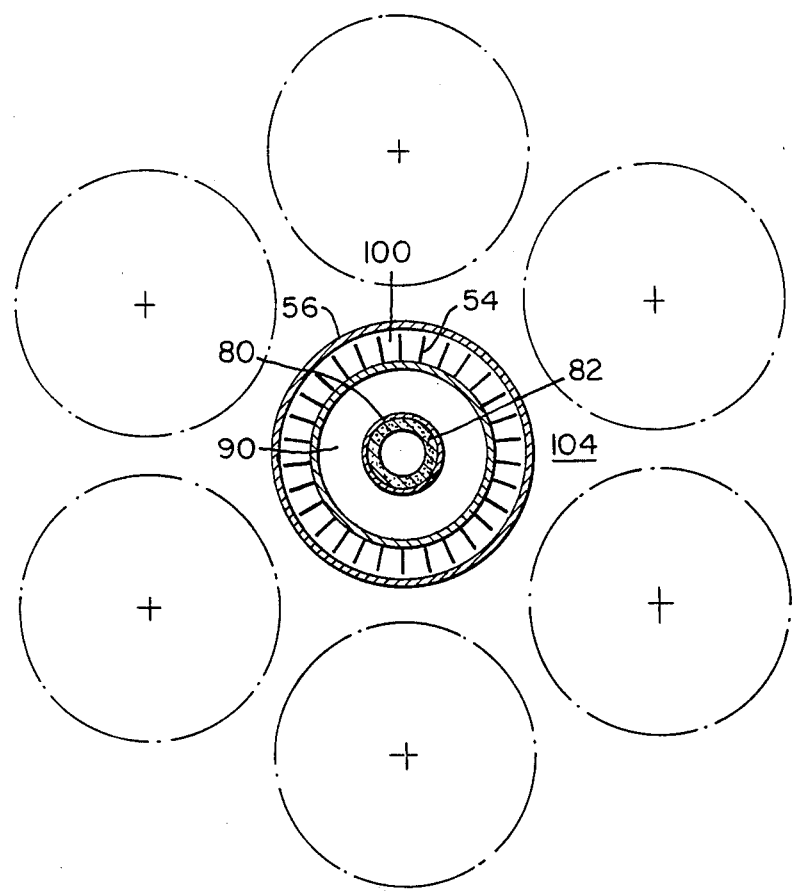
FIG. 4 is a cross-section of one of the reactors of FIGS. 1 and 2 showing in outline the relative location of adjacent reactors

As shown in FIG. 4 the tubular reactors constituted by the tubes 52 and 80 together with their sheaths 56 are conveniently disposed in an equilateral triangular array: since there is no gas flow in the space 104 between the sheaths of the adjacent reactors, the reactors may be spaced as close as is convenient from engineering considerations.

The inner tube 80 of each reactor is, as mentioned hereinbefore, provided with insulation 82. In FIG. 3 the insulation is shown extending for the whole length of tube 80. However it is not always necessary that it extends the whole length. In FIG. 5, which coresponds to FIG. 3 but omits the sheath 56, plate 96, and fin 54, the insulation is shown starting and terminating at distances $L_7$ and $L_8$ respectively below tube plate 72. It is preferred that $L_7$ is less than 10%, particularly less than 5% of $L_o$ and that $L_8$ is at least 30%, particularly at least 50% of $L_o$.

The insulation 82 is conveniently a ceramic fibrous material located adjacent the interior wall of tube 80. It is conveniently held in place by a thin gauge metal tubular cover 106 (shown in FIG. 6). As a result of the insulation 82, in use the gas temperature within cover 106 will exceed that outside tube 80 by a considerable extent and so there is liable to be a significant difference in the thermal expansion of tube 80 and cover 106 in the longitudinal direction. To compensate for this the construction shown in FIG. 6 is preferably adopted. At the lower end of tube 80 the cover 106 is welded at 108 to the interior surface of tube 80. The upper end 110 of cover 106 is not fastened to the wall of tube 80 but is free to expand and contract: the free end 110 of cover 106 is preferably flared.

It is often convenient to construct tube 80 in sections and welding together the sections end-to-end; in FIG. 6 a weld 112 is shown between two sections 80a and 80b. Each section is provided with its own layer of insulation 82a, 82b and cover 106a, 106b. At the lower end of each section the cover, e.g. 106b is welded, e.g. at 108b, to the interior surface of its tube, eg tube 80b. The flared end 110a of the cover 106a of the adjacent section is dimensioned such that, as shown in FIG. 6a, in the hot, i.e. expanded, state, the flared end 110a extends over the welded lower end 108b of the cover 106a of the adjacent section. In this way a space 114 containing stationary gas is provided as insulation between the end of the insulation 82a of one section and the start of the insulation 82b of the next section. Since the temperature difference, in use, between tube 80 and cover 106 will increase along the length of tube 80 from the lower end to the upper end of the insulated part of tube 80, where tube 80 is made in sections, the distance between the end 110a of cover 106a and the welded end 108b of tube 80b preferably increases, in the cold state, for successive joints from the lower end towards the upper end of the insulated part of tube 80.

The insulation 82 may be in a plurality of layers (not shown) each layer having, on its surface nearest the wall of tube 80, a metal foil layer (not shown).

Since the lower end of the, or each, cover 106 is fastened and the upper end or ends are free and the gas flow is up the inside of tube 80, the gas pressure at the upper end(s) of cover(s) 106 is less than at the lower end(s) thereof so that failure of cover(s) 106 leads to the insulation 82 rather than to implosion.

For a reactor to be operated at about 40 bar abs. pressure with a temperature of 800° C. at the lower end of tube 80, typical dimensions are, in mm.:
Tube 80 outer diameter: 31
Tube 80 wall thickness: 1.65
Cover 106 thickness: 0.5
Cover 106 internal diameter: 22
Ceramic fibre insulation layers, thickness, each about: 1

The effective internal cross-section available for gas flow within tube 80 may be selected to provide for sufficient pressure drop that, if the flow of gas is reversed, the catalyst particles in the space 90 between tubes 80 and 52 can be blown out: this enables discharging of the catalyst to be readily accomplished by connecting a source of pressurised gas to the outlet end 64 of tube 80 when discharge of the catalyst is required.

Since the sliding joint between pipe 68 and sleeve 102 will not be gas tight it is preferred that skirt 50 is dimensioned that, when in the hot state it is expanded sufficiently to restrict flow of secondary reformer gas between the outer surface of skirt 50 and concrete lining 24. In this way the amount of secondary reformer gas bypassing the spaces 100 between sheaths 56 and tubes 52 can be minimised.

To minimise carbon lay-down from the secondary reformer gas as it cools as it flows past tubes 52, it is preferred that at least the outer surface of tubes 52, fins 54 and the inner surface of sheaths 56 are made of stainless steel having a diffusion bonded surface layer of aluminum Also the upper surface of plate 96, the inner walls of shroud 94 and pipe 68 may have a similar construction.

Figure 7:
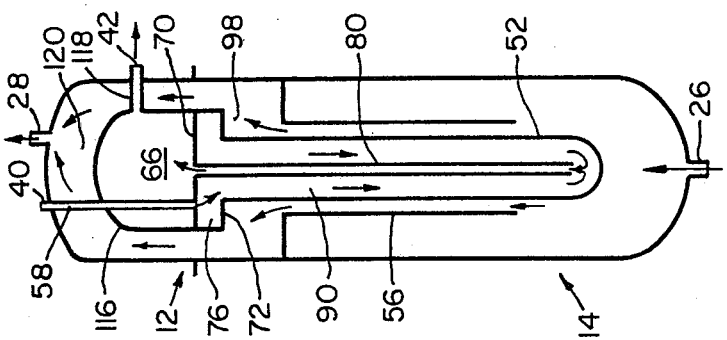
FIG. 7 is a view corresponding to FIG. 1 but showing an alternative reactor assembly in diagrammatic form

In FIG. 7 a slightly modified reactor assembly is shown diagrammatically. The construction is similar to that of the reactor assembly 10 of FIG. 1 except that the secondary reformer gas outlet 28 is located in the top section 12 of the assembly; dome 116 is provided above and sealed to upper tube plate 70 to enclose space 66 from which the primary reformed gas exits the assembly 10 via a pipe 118 connecting space 66 with port 42; shroud 94 is omitted and provision is made for cooled secondary reformer gas to leave enclosure 98 around the outside of the annular wall 74 of enclosure 76 and thence, via the space 120 between the dome 116 and the concrete lining of upper section 12, to outlet port 28.

Figure 8:
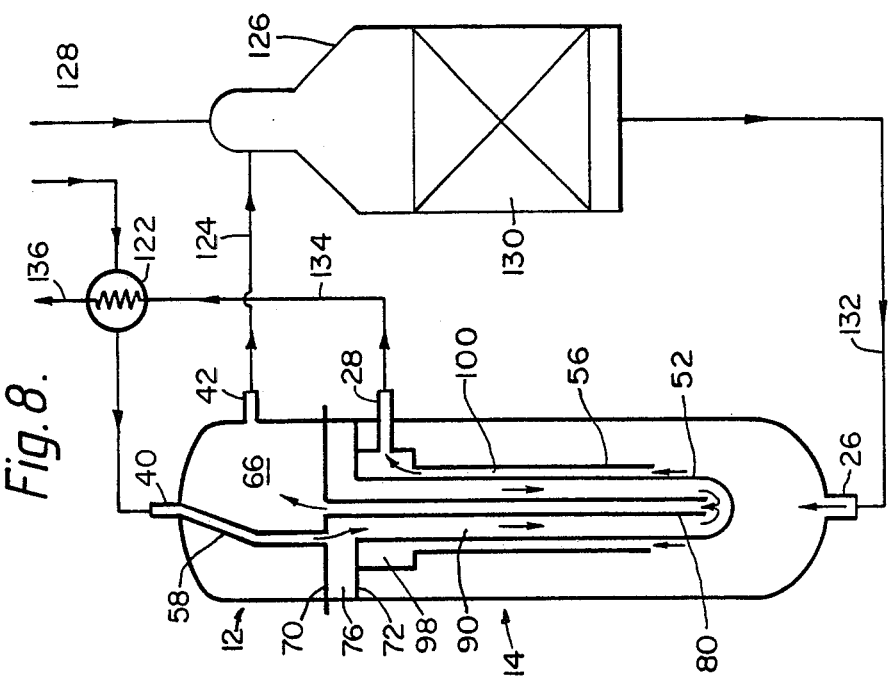
FIG. 8 is a flow diagram of the assembly of FIG. 1 in combination with a secondary reformer and heat exchanger.

In a typical process using the reactor assembly of FIGS. 1 to 4 (the arrows in FIGS. 2 and 3 indicate the flow of gas) a mixture of natural gas (1 vol) and steam (3 vols) at 40 bar abs. pressure is preheated in a heat exchanger 122 (see FIG. 8 wherein, for clarity, only one tubular reactor is shown) to 400° C. is supplied to enclosure 76 via pipe 58. The reactants then pass down through the catalyst, a supported nickel steam reforming catalyst, in space 90 between tubes 80 and 52 wherein it is heated by gas passing up space 100 between sheath 56 and 52. The gas passing up space 100 provides the heat for the endothermic steam reforming reaction over the catalyst. The reaction proceeds further as the reactants mixture passes down through the catalyst and as its temperature increases. At the bottom of tube 52, the resulting primary reformed gas, now typically containing 15-30% v/v of methane on a dry basis and is, for example now at a pressure of 37.6 bar abs and a temperature of 720° C., returned through tube 80. As a consequence of the insulation 82 the gas undergoes at most a limited heat loss to the reactant mixture in space 90. The primary reformed gas leaves the reactor assembly 10, via space 66 and outlet 42, at, typically 700° C., and enters, via line 124, a secondary reformer 126 (which can be of the conventional type consisting of a refractory lined, possible water jacketed vessel) to which hot air is supplied via line 128 to a suitable burner nozzle. The products of the resulting flame reaction are brought towards equilibrium at a methane content of typically 0.01 to 1% v/v on a dry basis over a nickel secondary reforming catalyst 130 from which the hot secondary reformed gas leaves, at typically, 1000° C. This hot gas is fed back via line 132 to reactor assembly 10 and enters the lower section 14 thereof via port 26.

The hot secondary reformer gas then passes past the lower ends of tubes 52 (which do not have fins), then past the unsheathed, finned portion, of tubes 52 and into and up space 100 between sheaths 56 and tubes 52 into enclosure 98. During its passage past tubes 52 the secondary reformer gas cools as it supplies heat to the reactants within space 90 between tubes 52 and 80. From enclosure 98 the cooled secondary reformer gas leaves the assembly 10 via pipe 68, typically at a pressure of 35.6 bar abs and at a temperature of 500° C. The gas is then fed, via line 134, to heat exchanger 122 where it acts as the heat source for preheating the natural gas/steam mixture. The reformed gas is then fed, via line 136, to further processing, e.g. shift and carbon oxides removal.

In FIG. 9 a graph is shown of calculated temperature profiles for a tubular reactor in accordance with the invention (lines A, B, C) ie with an insulated inner tube, and, by way of comparison, for an equivalent tubular reactor having no such insulation (lines $A^1$, $B^1$, $C^1$). Lines A and $A^1$ show the temperature profile of the heating medium outside the outer tube, lines B, $B^1$ the temperature profile of the reactants in the catalyst containing zone, and lines C, $C^1$ the temperature profile of the gas returning through the inner tube. It is evident that at, for example, a reactants temperature of 575° C. the temperature difference across the tubular reactor outer wall is about 60° C. according to the invention but only about 20° C. when heat exchange is permitted, and that the temperature difference is larger when using the invention at all other reactants temperatures. It is calculated that for a given gas output, corresponding for example to the production of 1000 metric tons per day of ammonia, the number of tubes required is only 83 to 86% of the number required if heat exchange across the walls of the inner tube is permitted. Moreover, the tubes can be shorter, with a heated length 66-73%, and hence a smaller catalyst volume, 57-64%, of that required if heat exchange across the walls of the inner tube is permitted.

We claim:

1. Apparatus for conducting an endothermic catalytic reaction comprising:
   (a) a tubular reactor having:
   (i) a first tube having a length, an internal cross-section, an internal surface, an external surface, an open end, and a closed end;
   (ii) a second tube having first and second open ends, an external cross-section smaller than said internal cross-section of said first tube, an internal surface bounding an interior of said second tube, and an external surface,
      said second tube disposed within said first tube and having a length such that said second tube extends said length of said first tube with said first end of said second tube spaced from said closed end of said first tube,
      thereby providing a first space between said external surface of said second tube and said internal surface of said first tube in fluid communication with said interior of said second tube;
   (iii) means for thermally insulating said second tube for at least part of said length thereof, said thermally insulating means being disposed on at least one of said internal and external surfaces of said second tube; and
   (iv) means for supporting a catalyst within said first space, so as to provide a catalyst zone within said first space and having a length extending for at least part of said length of said first space and for at least part of said thermally insulating length of said second tube;
   (b) means for supplying a heating fluid to said external surface of said first tube;
   (c) reactant inlet means connected to said open end of said first tube; and
   (d) product outlet means connected to said second end of said second tube.

2. Apparatus according to claim 1 wherein the thermally insulated length of said second tube is located adjacent at least a part of the length of the first tube extending from 10% to 30% of the length of said first tube, as measured from the open end of said first tube.

3. Apparatus according to claim 1 wherein the means for thermally insulating said second tube includes a sleeve having two ends with one end of said ends of said sleeve fastened to one of the internal or external surfaces of the second tube and the other end of said ends of said sleeve unfastened and free to expand or contract.

4. Apparatus according to claim 3 wherein the thermally insulating means includes a layer of fibrous insulation disposed between the sleeve and the internal or external surface of the second tube to which the sleeve is fastened.

5. Apparatus according to claim 1 wherein the second tube comprises a plurality of welded together tube sections and said thermally insulated length of the second tube comprises at least two adjacent tube sections of said plurality of tube sections, and the thermally insulating means includes at least two sleeves each having two ends with one end of said ends of each sleeve fastened to one of the internal or external surfaces of a respective one of the at least two adjacent tube sections and the other end of said ends of each sleeve unfastened and free to expand or contract, the unfastened end of the sleeve of one section of said at least two adjacent sections being adjacent the fastened end of the sleeve of the section adjacent said one section.

6. Apparatus according to claim 5 wherein the fastened end of each of said sleeves is upstream of the unfastened end of its respective sleeve.

7. Apparatus according to claim 5 wherein the sleeves are fastened to the internal surfaces of the at least two adjacent tube sections.

8. Apparatus according to claim 5 wherein the thermally insulating means includes a layer of fibrous insulation disposed between each sleeve of said at least two sleeves and the internal or external surface of the respective tube section of the at least two adjacent tube sections to which each said sleeve is fastened.

9. Apparatus according to claim 1 wherein the length of the first tube has a major part and the first space has a cross-sectional area, and a sheath is provided surrounding, and spaced from, the external surface of said first tube and extending for at least said major part of said length of said first tube, thereby providing a second space between said sheath and said first tube, said second space having a cross-sectional area between 0.1 and 1.0 times said cross-sectional area of said first space.

10. Apparatus according to claim 9 wherein the major part of the length of the first tube is 70 to 90% of the length of said first tube, as measured from the open end of said first tube, and said sheath extends for said major part thereby leaving 10 to 30% of the length of the first tube unsheathed at said closed end.

11. Apparatus according to claim 1 wherein the external surface of said first tube has, for at least a major part of its length, extended heating surface means so as to provide the first tube with an increased external surface area which is 1.5 to 10 times the surface area of the first tube without the extended heating surface means.

12. Apparatus according to claim 11 wherein the major part of the length of said first tube extends from 80 to 96% of the length of said first tube as measured from the open end of said first tube and said extended heating surface means extends for said major part.

13. In a double tube reformer having
a first tube having a first closed end, a second open end, an external surface, and an internal cross-section; and
a second tube disposed within said first tube and having an internal surface, an external surface, first and second open ends, and an external cross-section smaller than said internal cross-section of said first tube
thus defining a space between said tubes for receipt of a catalyst;
said second tube having its first end spaced from said closed end of said first tube;
the improvement comprising means for thermally insulating said second tube for at least part of said length of said second tube, and disposed on at least one of said internal and external surfaces of said second tube whereby improved heat transfer may be achieved between a heating medium heating said external surface of said first tube and reactants passing through the space.

14. Apparatus for conducting an endothermic catalytic reforming reaction comprising:

(a) at least one tubular reactor having:
(i) a first tube having a length, an internal cross-section, an internal surface, an external surface, an open end, and a closed end;
(ii) a second tube having first and second open ends, an external cross-section smaller than said internal cross-section of said first tube, an internal surface bounding an interior of said second tube, and an external surface,
said second tube disposed within said first tube, and having a length such that said second tube extends said length of said first tube with said first end of said second tube spaced from said closed end of said first tube,
thereby providing a first space between said external surface of said second tube and said internal surface of said first tube and establishing fluid communication between the interior of said second tube and said first space;
(iii) means for thermally insulating said second tube for at least part of said length thereof, said means being disposed on at least one of said internal and external surfaces of said second tube;
(iv) means for supporting a catalyst within said first space so as to provide a catalyst zone within said first space and having a length extending for at least part of said length of said first space and for at least part of said thermally insulated length of said second tube;
(b) an outer shell within which said at least one tubular reactor is located, said outer shell having an inlet and an outlet providing means for supplying heating fluid to said external surface of said first tube of said at least one tubular reactor;
(c) reactant inlet means connected to said open end of said first tube of said at least one tubular reactor; and
(d) product outlet means connected to said second end of said second tube of said at least one tubular reactor.

15. Apparatus according to claim 14 for conducting an endothermic catalytic reforming reaction including:
(a) a secondary reformer external to the outer shell, said secondary reformer having an inlet and an outlet,
(b) means for supplying a gas containing free oxygen to said secondary reformer,
(c) first conduit means connected to said outlet of said secondary reformer and to the inlet of said outer shell,
(d) second conduit means connected to the reactant inlet means for supplying a reactant gas stream thereto, and
(e) third conduit means connected to the product outlet means for delivering a product gas stream from said product outlet means to said inlet of said secondary reformer.

* * * * *